J. OAKLEY.
EXPANDING BROACHING TOOL.
APPLICATION FILED MAR. 24, 1916.
1,201,614.
Patented Oct. 17, 1916.
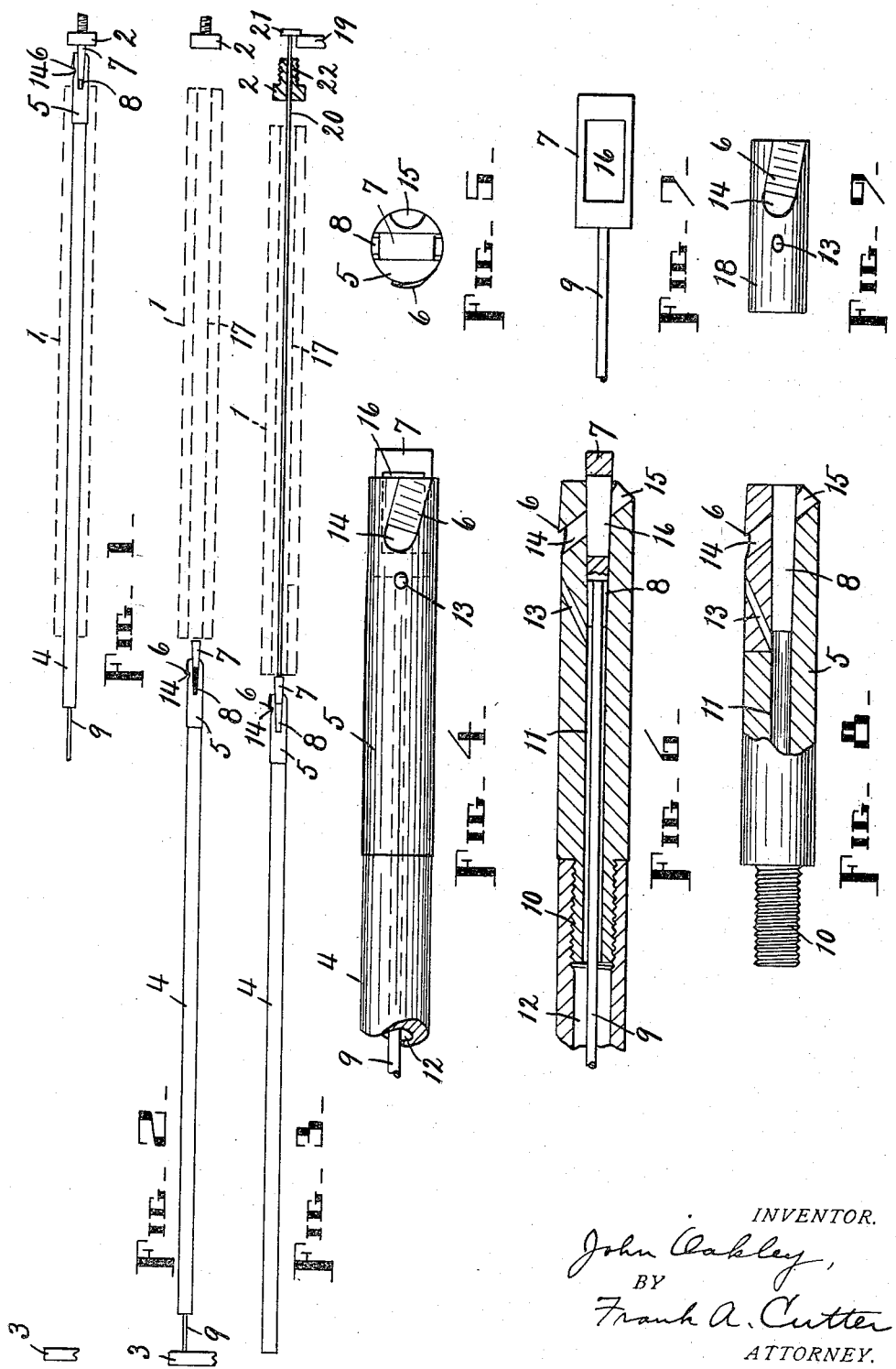
INVENTOR.
John Oakley,
BY
Frank A. Cutter,
ATTORNEY.

UNITED STATES PATENT OFFICE.

JOHN OAKLEY, OF SPRINGFIELD, MASSACHUSETTS.

EXPANDING BROACHING-TOOL.

1,201,614.   Specification of Letters Patent.   Patented Oct. 17, 1916.

Application filed March 24, 1916. Serial No. 86,489.

*To all whom it may concern:*

Be it known that I, JOHN OAKLEY, a subject of the King of Great Britain, residing at Springfield, in the county of Hampden and State of Massachusetts, United States of America, have invented a new and useful Expanding Broaching-Tool, of which the following is a specification.

My invention relates to improvements in tools for forming or cutting either straight or spiral grooves in the bores of tubular objects, and more especially for rifling purposes, that is, for rifling gun barrels and ordnance, such tools being employed in rifling machines, and said invention comprises a broach of special construction, which is provided with an expanding wedge, together with certain peculiar means for operating said wedge, all as hereinafter set forth.

The primary object of my invention is to provide a broaching tool, for rifling and other purposes, which is much less expensive to manufacture than such tools in common use, and with which the work can be much more expeditiously done than has heretofore been possible.

A further object is to provide such a tool with ample clearance facilities, so that the chips cut therewith clear the cutter or tooth and pass through the cutter tip and away, without obstructing or impeding the action of the tool.

Still another object is to produce a tool of this kind that can be freely and fully lubricated.

This tool can be used in a rifling machine, like any other rifling tool, and is practicable and efficient in all respects.

Other objects and advantages will appear in the course of the following description.

I attain the objects and secure the advantages of my invention by the means illustrated in the accompanying drawings, in which—

Figure 1 is a side elevation of an expanding broaching tool, together with certain parts of a rifling machine, the whole embodying a practical form of my invention; Fig. 2, a side elevation of said tool and parts similar to what is shown in the preceding view, except that in Fig. 1 the tool is at the rear end of its stroke, while in Fig. 2 said tool is at the front end of its stroke; Fig. 3, a side elevation of the tool and parts as disposed in Fig. 2, but illustrating a modification in the means for retracting the wedge; Fig. 4, an enlarged top plan of the rear or cutting end portion of the tool showing the wedge positioned as in the first view; Fig. 5, a rear end elevation of the tool as shown in Fig. 4; Fig. 6, an enlarged central longitudinal section through the parts at the cutting-end terminal portion of said tool; Fig. 7, an enlarged detail of the wedge; Fig. 8, an enlarged side elevation and partial section of a modified form of tip and cutter, and, Fig. 9, an enlarged detail including the cutter provided for said last-mentioned tip.

Similar reference numerals designate similar parts throughout the several views.

As already intimated, this tool may be used in a rifling machine. Such a machine is old and well known and I therefore do not show the same, but merely indicate by broken lines 1, in Figs. 1 and 2, the position of a gun barrel for example held in such a machine, and represent at 2 a member which is a part of the usual feeder mechanism. Said feeder mechanism is at the rear end of the machine, and is so operated that the member 2 is advanced a trifle at each cycle of said machine. Either a stop 3, Figs. 1 and 2, is placed at the front end of the rifling machine, or a stop 19, Fig. 3, is placed at the rear end of the machine. Either of these stops is a new and added element, the purpose of which will be hereinafter explained. The reciprocal path of the tool in the first case is between the feeder member 2 and the stop 3, or between an intermittently progressive abutment represented by said feeder member, at the rear end, and a fixed abutment, represented by said stop, at the front end, said intermittently progressive abutment moving forwardly or advancing in the direction of the active or cutting stroke or travel of the tool; while in the second case such path is in front of both said member 2 and the fixed abutment or stop 19. The mechanism for actuating the broaching tool is not shown.

The broaching tool comprises a tube 4, a cutter tip 5 at the rear end of said tube, such tip being provided with a cutter or tooth 6, a wedge 7 inserted and operating in a slot 8 in the rear end of said tip, and either a long stem or rod 9 which extends from the narrow inner end of said wedge through said tip and tube and beyond the front end of the tube, or a similar stem or rod 20 which extends from the large outer end or head of said wedge through the feeder member 2, and has a stop projection or collar 21 fixed on its rear end behind the stop 19.

The tip 5 may be attached to the tube 4 by means of a screw-threaded tail-piece 10 which is tapped into the rear end of said tube, or in any other usual and well-known manner. The slot 8 is transverse of the tip 5 and opens through the rear end thereof, and said slot is parallel with the cutting edge of the tooth 6 or with the chord of the arc formed by such edge, or approximately so, according to the shape of such cutting edge and to the nature of the cut or groove made by said cutting edge. A central passage 11 leads forward from the inner end of the slot 8 through the tip 5 and the tail-piece 10, and said passage at the front end opens into a central longitudinal passage 12 through the tube 4. The stem or rod 9 when employed extends through the passages 11 and 12 and is smaller in diameter than either of said passages. A branch 13 extends obliquely from the passage 11, at a point near the junction of said passage 11 with the slot 8, to open through the side of the tip 5 a short distance from the rake of the tooth 6 and adjacent to said rake.

The passages 12, 11 and 13 afford an ample passageway for the flow of oil to the tooth 6, and constitute one means whereby may be effected the adequate lubrication of the tool, but I do not confine myself to such means. The passages 12 and 11 are large enough to accommodate the rod 9 when employed and permit the oil to flow to the passage 13.

An oblique chip passageway is made up of slots 14 and 15 in the tip 5 and a slot 16 in the wedge 7, or the slot 8 with said slot 16, the slot 14 opening at the outer end just in front of the rake of the tooth 5 and at the inner end into the slots 8 and 16, and the slot 15 opening at the outer end at the extreme rear-end edge of said tip and at the inner end into said slots 8 and 16. As the chips are cut by the tooth 6 they pass immediately into and through the aforesaid passageway and out into the bore of the gun barrel 1, behind and clear of the tool, such bore being indicated at 17 in Figs. 2 and 3. The chips thus clear the tool as soon as cut and so do not interfere with the cutting action or advance of said tool.

The combined length of the tube 4 and tip 5 is greater than the length of the gun barrel 1.

The tooth 6 is, of course, located with its cutting edge at the front end, and said tooth may either be integral with the tip 5, as shown in the first six views, or originally a separate member or part of a separate member, as shown in the last two views, wherein the tooth forms part of a block 18. The tip 5 is slotted to receive the block 18 and the latter is inserted therein and sweated or otherwise firmly and securely fixed in place so that it becomes, to all intents and purposes, an integral part of said tip. The locations of the passages 13 and the slots 14 are the same in both cases. The cutting edge of the tooth 6 projects slightly beyond the outside diameter or circumference of the tip 5, as usual, which circumference fits the bore 17 of the barrel 1. The outer face of the tooth 6 inclines inwardly and rearwardly as shown. The tooth 6 is arranged at an angle that corresponds to the helix of the rifling or groove which it is designed to cut. This angular arrangement naturally and necessarily will vary in different tools for different grooves, and will be absent from a tool designed for straight work.

The wedge 7 is here of sufficient length to leave the rear and large end or head thereof protruding at all times from the corresponding end of the slot 8. The office of the wedge 7 is to expand the longitudinally slotted part of the tip 5 and by so doing increase the amount of the projection of the cutting edge of the tooth 6 beyond the circumference of said tip, thereby deepening the cut made by said tooth, and to permit said slotted part to contract and withdraw the tooth to decrease said amount of projection.

Assuming that the tool is in the position represented in Fig. 1, and that the wedge 7 is driven in to the tip 5, by reason of the contact of said wedge with the feeder member or intermittently progressive abutment 2, only far enough to support the tooth 6 in position to make the first cut, the operation of said tool is as follows: The tool is forced to travel to the left until the tooth 6 has passed through the barrel 1 and commenced a groove therein. When the tool approaches the left-hand end of its reciprocable travel, if the stop 3 and the rod 9 be present, the protruding end of said rod encounters said stop, as in Fig. 2, and is actuated to the right, carrying with it the wedge 7 and so relieving the tension that was put upon the split terminal of the tip 5 by said wedge; or, if the rod 20 with its collar 21 be used instead of said rod 9, and the rear-end stop 19 instead of the front-end stop, said collar encounters said stop 19, as in Fig. 3, and is held thereby and with it the rod 20 and said wedge, so that the latter is partially withdrawn from said tip or retracted as the tip continues on to the end of its forward travel after the collar has come to rest against the stop 19, with the result that the tension on the aforesaid split terminal is relieved as in the first instance. By either of these means the split terminal of the tip 5 is permitted to contract and draw the tooth 6 inwardly, so that, when said tool is returned through the bore 17, the tooth does not rub its cutting edge along the path in the barrel 1 which such edge has just cut for itself. Next the tool is retracted and returned to initial position, the tooth 6 passing freely through the barrel, as explained, and out of the rear end of said barrel. The head of the wedge 7 at initial position encounters the abutment 2, which has been advanced a trifle into the path of said wedge, and the latter is forced forward into the tip 5 and driven in a little farther than before, with the result that the tooth 6 is projected outwardly again and this time slightly beyond its former position when at the rear end of the barrel 1. The rod 9 moves away from the stop 3, or the collar 21 from the stop 19, whichever of these wedge-retracting means be employed, when the tool starts to return to initial position. The tool is now forced to the left through the barrel 1 a second time, and the tooth 6 takes off a little more of the metal and deepens the groove. At the left-hand end of the travel of the tool the abutment 3 is again encountered by the rod 9 and the latter is driven back and carries with it the wedge 7, which operation once more releases the tooth 6 so that it can return freely through the barrel as before; or else said wedge is again retracted by the stop 19, collar 21 and rod 20, in the manner and in the event previously explained The tool is again returned to the right-hand end of its travel, where the abutment 2, having advanced still farther into the path of the wedge 7, causes the latter to be driven still deeper into the tip 5. This action further increases the amount of projection of the tooth 6, over the last previous amount of such projection, consequently when the third cutting stroke is made the groove is deepened again. And so the operations are repeated until the groove in the barrel is of the required depth. In rifling the tool revolves forward and back, in the course of its reciprocable travel, as is well understood. As fast as a chip is cut by the tooth 6 and as cut it passes into and through the slots 14, 16 and 15 and out behind the tip 5 into the bore 17, without interfering with the action of the tool. The slot 16 in the wedge 7 is wide enough to permit of the passage of chips cut by the tooth 6, as are the slots 14 and 15, and said slot 16 is of sufficient length to avoid closing the chip-clearance passageway when said wedge is at either extremity of its adjustment. The rod 20 is enough smaller than the bore 17 to leave room in said bore for the escape of the chips into and through the same. In the present construction the oil is forced through the passages 12, 11 and 13 to the outside of the tip 5 in front of the tooth 6. It is necessary to bore a central opening longitudinally through the feeder member 2, when the rod 20 is used, for the passage of said rod, as shown at 22 in Fig. 3.

Various other changes and modifications, in addition to these hereinbefore particularly mentioned, may be made in the tool and the operating parts therefor, not only in shape and size, but also in the construction and arrangement of some or all of its parts, without departing from the nature of my invention as defined by the scope of my claims.

What I claim as my invention, and desire to secure by Letters Patent, is—

1. As an improved article of manufacture, a broaching tool comprising a tip slotted through one end and provided with a cutter, the slot in said tip being between the part of the tip that carries said cutter and the approximately diametrically opposite part, and a wedge for said slot.

2. As an improved article of manufacture, a broaching tool comprising a tube, a slotted tip attached to said tube and provided with a cutter, the slot in said tip being between the part of the tip that carries said cutter and the approximately diametrically opposite part, a wedge for said slot and accessible at one end through the adjacent end of said slot, and a stem connected with said wedge at the opposite end and extending through said tip into said tube and through the latter.

3. As an improved article of manufacture, a broaching tool comprising a slotted tip provided with a cutter, the slot in said tip being between the part of the tip that carries said cutter and the approximately diametrically opposite part, and a wedge for said slot, said tip and wedge having slots therein to form a chip-clearance passageway.

4. As an improved article of manufacture, a broaching tool comprising a tube, a slotted tip attached to said tube and provided with a cutter, said tip having a longitudinal passage and a branch passage therein, the former opening at one end into the latter and at the other end into the passage in said tube, and said branch passage opening at the outer end in the vicinity of said cutter, and the slot in said tip being between the part of the tip that carries said cutter and the approximately diametrically opposite part, a wedge for said slot and accessible at one end through the adjacent end of said slot, and a stem connected with said wedge at the opposite end and extending through said longitudinal passage in said tip into and through said tubular passage, the diameter of each of the passages through which said stem extends, being of larger diameter than said stem, in order to admit oil to said branch passage.

5. The combination, with a broaching tool comprising a split expanding tip provided with a cutter, of means to enable said tip to contract and draw in said cutter when the tip arrives at the forward end of its travel.

6. The combination, with a broaching tool comprising a tubular member, a slotted tip attached to said tubular member, and provided with a cutter, and a wedge in the slot in said tip, of means to retract said wedge after the tool has made its cut.

7. The combination, with a broaching tool comprising a tubular member, a tip slotted through one end and attached to such member, and provided with a cutter, and an expanding wedge for said tip in the slot therein, of means to drive in said wedge, to expand said tip and project said cutter, when the tool arrives at the rear end of its travel, and means to retract said wedge after said tool has made its cut.

8. The combination, with a broaching tool comprising a tube, a tip attached to said tube and provided with a cutter, said tip being slotted through one end, and the slot in said tip being between the part of the tip that carries said cutter and the approximately diametrically opposite part, and an expanding wedge for said tip in said slot, of an abutment in the path of travel rearwardly of the head of said wedge.

9. The combination, with a broaching tool comprising a tube, a tip attached to said tube and provided with a cutter, said tip being slotted through one end, and the slot in said tip being between the part of the tip that carries said cutter and the approximately diametrically opposite part, and an expanding wedge for said tip in said slot, of a progressive abutment in the path of travel rearwardly of the head of said wedge.

10. The combination, with a broaching tool comprising a tubular member, a slotted tip attached to such member, and provided with a cutter, a wedge in the slot in said tip, and a rod extending from said wedge, of means acting through said rod to retract said wedge, after the tool has made its cut.

11. The combination, with a broaching tool comprising a tube, a slotted tip attached to said tube and provided with a cutter, the slot in said tip being between the part of the tip that carries said cutter and the approximately diametrically opposite part, and a wedge in said slot, said wedge having a stem that extends forward through said tip and tube, of an abutment in the path of travel forwardly of the front end of said stem.

12. The combination, with a broaching tool comprising a tubular member, a slotted tip attached to such member, and provided with a cutter, a wedge in the slot in said tip, and a rod extending from said wedge, of means to drive in said wedge, to expand said tip and project said cutter, when the tool is at the rear end of its travel, and means acting through said rod to retract said wedge, after said tool has made its cut.

13. The combination, with a broaching tool comprising a tube, a slotted tip attached to said tube and provided with a cutter, the slot in said tip being between the part of the tip that carries said cutter and the approximately diametrically opposite part, and a wedge in said slot, said wedge having a stem that extends forward through said tip and tube, of an abutment in the path of travel rearwardly of the head of said wedge, and an abutment in the path of travel forwardly of the front end of said stem.

JOHN OAKLEY.

Witnesses:
A. C. FAIRBANKS,
F. A. CUTTER.